United States Patent [19]

Leenhouts

[11] 3,968,416
[45] July 6, 1976

[54] MOTOR CONTROL FOR A STEPPING MOTOR
[75] Inventor: Albert C. Leenhouts, Harwinton, Conn.
[73] Assignee: The Superior Electric Company, Bristol, Conn.
[22] Filed: July 1, 1974
[21] Appl. No.: 484,990

[52] U.S. Cl. .............................................. 318/696
[51] Int. Cl.² ........................................ H02K 37/00
[58] Field of Search.................... 318/138, 254, 696

[56] References Cited
UNITED STATES PATENTS

| | | |
|---|---|---|
| 3,445,741 | 5/1969 | Gerber............................. 318/696 |
| 3,746,958 | 7/1973 | Leenhouts......................... 318/696 |
| 3,775,657 | 11/1973 | Takai et al.......................... 318/696 |
| 3,800,206 | 3/1974 | Hinachi et al. .................... 318/696 |

Primary Examiner—Gene Z. Rubinson
Attorney, Agent, or Firm—Ernest M. Junkins

[57] ABSTRACT

A motor control for a stepping motor having windings energizable in a predetermined sequence to produce an incremental movement for each command pulse has a programmed read only memory. The control can be set so that each input pulse can command either a half or a full step and the control can further be set to have half step high speeds energize the motor for full steps for every other command pulse to thereby increase the high speed half stepping torque.

11 Claims, 2 Drawing Figures

MOTOR CONTROL FOR A STEPPING MOTOR

In my U.S. Pat. No. 3,746,958, granted July 17, 1973 and assigned to the assignee of the present invention, there is disclosed a motor control for changing the energizations of a stepping motor in a predetermined sequence with a change occurring with each command pulse. The sequence may be either a four step sequence which produces full steps for each command pulse or an eight step sequence which produces half steps for each command pulse. In addition the direction of the step may also be controlled. Thus, the input directions to the motor include both the direction and the extent of each step together with the number of steps with the latter being set by the number of command pulses.

The control includes a resistor diode matrix together with a three bit adder and delay type bistable flip-flops. While this circuit has been found satisfactory, it contains a substantial quantity of parts which tends to render it somewhat expensive, somewhat large in the physical size of the circuit and somewhat high in labor manufacturing time. In addition, when the control is directed to have the one half step sequence, the higher speed torque is somewhat reduced as half of the energizations in the half step sequence only have half of the winding phases energized as compared to all winding phases being energized for all steps in a full step sequence.

It is accordingly an object of the present invention to provide a motor control in which input information of direction, extent of a step and command pulses are translated into comparable energizations of the winding phases of a stepping motor by a circuit that is composed of relatively few elements and particularly employs a programmed read only memory.

Another object of the present invention is to achieve the above results with a motor control that is more economical to fabricate, requires less labor and may be more compactly constructed than heretofore similar motor controls.

A further object of the present invention is to provide a motor control in which the energization of the motor at higher speeds, when commanded to move in a half step sequence, is made to occur as if a full step sequence wherein the motor produces a higher torque than if the windings were always energized according to their half step sequence.

In carrying out the present invention, a substantial number of the components in the control disclosed in my abovenoted patent are replaced by a programmed read only memory having an input and an output. The input is formed by a plurality of terminals (sometimes called address lines) as for example 5, with a binary voltage state of 1 or 0 being impressable on each so that there thus could exist 32 ($2^5$) possible input conditions on this size of a memory. The output also has a plurality of terminals, specifically 8, each of which may have a binary voltage state of 1 or 0 so that the output has 256 possible conditions. However, each input condition is made to produce an output condition that is unique to it and different from any other output condition. Accordingly an output condition can only occur when the input has its associated input condition.

As there are only four winding phases of the motor, four of the eight output terminals of the memory are connected thereto to control the energization of each according to the state of its associated output terminal. Three more of the output terminals have their states used to provide the binary states for the next condition of three of the input terminals. The remaining output terminal is employed for aiding a half stepping to full stepping circuit.

A fourth input terminal is used to receive the direction command to the motor control and the last input terminal is connected to receive the half or full step command.

Each command pulse causes the output of the memory to not only energize the proper winding phase but also to set the three more output terminals to have the states needed by the three input terminals to provide the input condition that assures the next energization of the winding phases according to the sequence being followed. Thus, the present input condition of the memory provides at the output, most of the next input condition required for the winding phases' energization in the next step of the sequence. The shift of the input condition only occurs with a command pulse and in the absence of a pulse the winding phases' energization remains constant.

In a movement where each command pulse is directed to produce an incremental movement that is a half step to have eight steps in a sequence instead of four, only one of the winding phases is normally energized for half of the steps in the sequence which decreases the available torque of the motor as compared to the full step sequence when two phases of the windings are energized for all steps. The present motor control increases the motor torque at higher stepping speeds during a half step movement by utilizing the full step sequence though at low speeds the half step sequence is used. In this manner, the output torque is increased where needed, i.e., for high speed movement while resolution is maintained during the low speed movement.

Other features and advantages will hereinafter appear.

Referring to the drawing

Figures 1, 2:
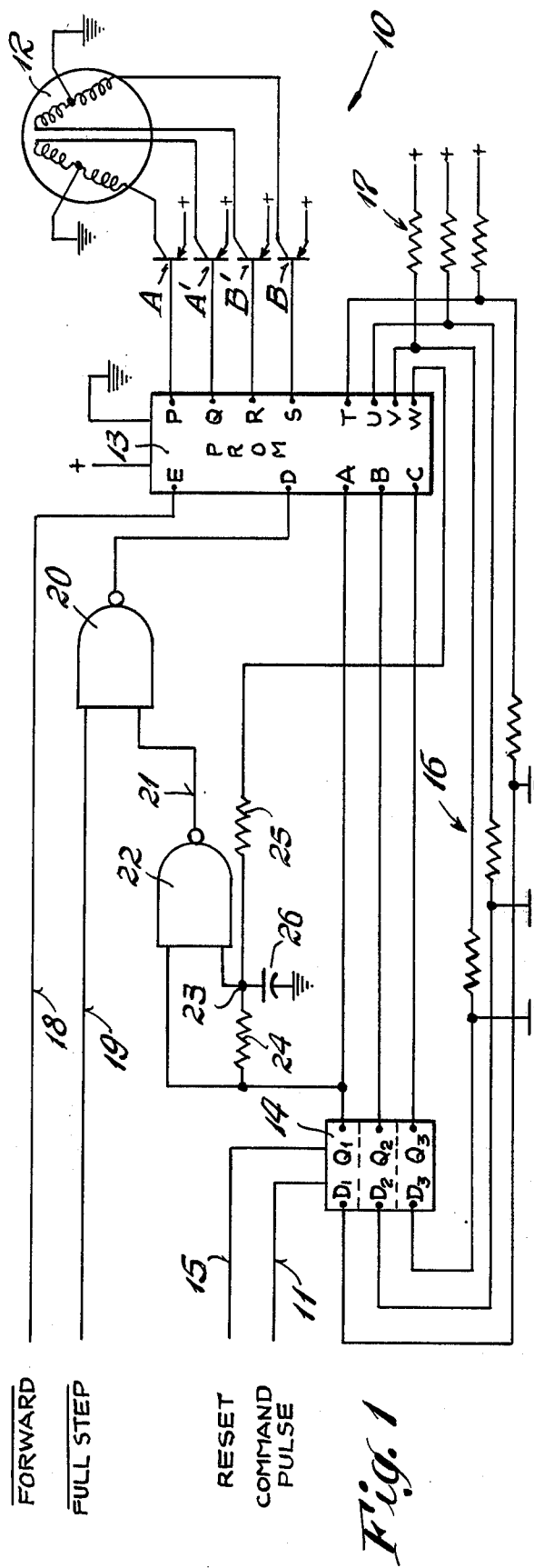
FIG. 1 is a block and schematic view of the circuitry of the present invention.
FIG. 2 is a chart showing the states of the output of the memory for different conditions at its input.

Referring to the drawing the motor control of the present invention is generally indicated by the reference numeral 10 and is used to translate each command pulse received on a lead 11 into an incremental movement of a stepping motor 12 essentially simultaneously. As shown, the motor has four winding phases each of which has its energization controlled by conduction of a transistor associated therewith and denoted A, A', B and B'. For producing a full step for each command pulse, the transistors are caused to be conducting in a four step sequence consisting of AB', A'B', A'B, AB, AB' etc., for movement in one direction and reversely of the sequence for movement in the other direction. For producing a half step movement for each command pulse, the transistors are rendered conducting according to the sequence AB', B', A'B', A', A'B, B, AB, A, AB' for movement in one direction and reversely for movement in the other direction.

A programmed read only memory 13 is provided with eight output terminals denoted P, Q, R, S, T, U, V and W, with the output terminals P, Q, R and S being connected to the base of transistors A, A', B' and B, respectively. Referring to the terminal P and its associated transistor A, the winding phase associated with the transistor A will become energized only when the transistor A is rendered conducting by output terminal P having an essentially ground voltage which corresponds to a logic level or state of O. The other three transistors and their winding phases are similarly energized by their associated output terminals.

The output terminals T, U and V are each connected to an input terminal of three D type edge triggered flip-flops so that the terminal T is connected to the input terminal D1 of the first flip-flop, the terminal U is connected to the input D2 terminal of the second flip-flop and the output terminal V is connected to the input terminal D3 of the third flip-flop. The output terminals of the three flip-flops indicated within the block 14 are denoted Q1, Q2 and Q3 and are connected to input terminals A, B and C respectively of the memory 13. The flip-flops 14 are moreover connected to the command pulse input lead 11 so that each command pulse causes each flip-flop to have its output terminal Q copy the state of its input terminal. In the absence of a command pulse, changes may be made in the flip-flops input terminal states without altering the state of its respective output terminal. A reset lead 15 is also connected to each of the flip-flops and is utilized to initialize the system by setting all output terminals Q to a O state.

There is additionally shown resistance capacitor networks indicated generally by the reference numeral 16 between the output terminals of the memory 13 and the input terminals of flip-flop 14 in order to introduce delay into the circuit to prevent erroneous signals from appearing during shifting between binary states. Further, a voltage is applied to each of the output terminals T, U and V by way of each having a resistance 17 connected to a positive source and these are utilized to provide a positive voltage level of the memory output when the outputs have a 1 state.

In addition to the input terminals A, B and C, the memory 13 further has input terminals D and E. The input terminal E is connected to a lead 18 in which a voltage level of 1 is impressed if it is desired for the motor to move in a reverse direction while if it is to move in a forward direction a voltage level of 0 is impressed. The state of this input terminal thus sets the direction of movement of the motor.

A lead 19 receives the command of whether or not the motor is to take a half or a full step for each command pulse by a voltage level of 0 being impressed when a full step is desired and a voltage level of 1 when a half step or "not full step" is desired. The lead 19 is connected as one input to a NAND gate 20 whose output is connected to the input terminal D. The other input of the NAND gate 20 is connected to the output 21 of another NAND gate 22 which in turn has one input connected to the terminal Q1 and its other input connected to a junction 23. A resistor 24 is connected between the junction 23 and the terminal Q1 while another resistor 25 is connected between the junction 23 and the output terminal W. A capacitor 26 is connected between the junction 23 and ground.

In the operation of the circuit, assuming that it is desired to produce full steps in a forward direction, a voltage state of 0 is impressed on the leads 18 and 19 and a reset command is given on the lead 15. Terminals Q1, Q2 and Q3 will then each assume a O state as will their input terminals A, B and C of the memory while terminal D will have a 1 state and terminal E a O state. Referring to FIG. 2, wherein are shown the 32 different possible input conditions, the input condition above represented by states of the input terminals is indicated by the reference numeral C8 and the memory is programmed so that for this input condition then the output condition will have the states vertically aligned therewith. Accordingly, terminals P and R will have a zero state causing conduction of transistors A and B' and hence energization of their associated winding phases. In addition, terminals T, U and V will have the states of 0, 1 and 0 which are impressed upon flip-flop terminals D1, D2 and D3, respectively. The terminal W will have a O state.

With the circuit thus initialized, it will so remain with the winding phases of transistors A and B' energized until a command pulse on the lead 11 causes each terminal Q to copy its respective terminal D which then will produce an input condition indicated by reference character C10 on the memory. As a result the output condition vertically aligned therewith will effect conduction of the transistors A' and B' as terminals Q and R are at the O state and the states of O, 0 and 1 will be impressed on the flip-flop 14 inputs. The next energization in the full step, forward sequence is thus produced.

The next command pulse will cause the states of T, U and V (and $D_1$, $D_2$ and $D_3$) for condition C10 to be part of the next input condition providing condition C12 which causes conduction of the transistors A' and B and in turn sets the next input condition to produce upon receipt of the next command pulse, the condition C14 which causes conduction of transistors A and B. The next command pulse will effect input condition C8 which starts to repeat the four step sequence.

For an input command of full steps in a reverse direction wherein the lead 18 has a 1 state impressed thereon so that the terminal E has a 1 state, a reset command on the lead 15 will produce condition C24 and a following command pulse will cause the input condition C30 to exist which changes the conduction of transistors A and B' to A and B. The next command pulse will cause the condition C28 to occur and thus the four step sequence in a reverse direction will be effected.

For a command to move forward but with only a half step for each command pulse, the state on the lead 19 is made to be a 1 which upon initialization by the reset 15 causes the condition CO to exist. The input terminal D has a 0 state by reason of both inputs to the NAND gate 20 being 1 and at least one input to NAND gate 22 being a 0. Upon receipt of the first command pulse, the terminals Q1, Q2 and Q3 (and hence terminals A, B and C) will assume the states of 1, 0, 0, respectively which makes one input to the NAND gate 22 a 1 while the junction 23, the other input to the NAND gate, is maintained at a 0 state by reason of the capacitor 26 being discharged. The condition of the memory terminals is indicated by reference character C1. However, the condenser begins to be charged from just the terminal Q1 which has a state of 1 while the terminal W, by being also a 1, is open, permitting the charge to accumulate.

During the charging of the capacitor 26 to a positive voltage which represents a state of 1, the junction 23 will have a 0 state, the output 21 a 1 state and the terminal D a 0 state in order to maintain the condition C1. However, when the junction 23 reaches the 1 state voltage level, the terminal D will change to a 1 state by output 21 assuming a 0 state. The memory thus assumes and maintains the condition C9 until the next command pulse. During the condition C9, the only transistor rendered conducting is B' and hence the sequence has produced the next energization after the condition C0, namely, transistors A and B' conducting to just transistor B' being conducting.

The next command pulse will cause the T, U and V terminal states of condition C9 to be impressed upon the input terminals A, B and C which produce the condition C2 wherein the terminal Q1 has a 0 state and the capacitor 26 is discharged primarily through the terminal W which is at a 0 state, the terminal D is at the 1 state and the conduction of the transistors A', B' is caused to occur. For the next command pulse, condition C3 occurs for the duration that the capacitor 26 is being charged from a voltage level corresponding to a 0 state to a 1 state at which time the input condition will shift to that indicated by reference character C11 wherein just transistor A' is caused to be conducting. The circuit will continually function in such a manner for each command pulse until after eight command pulses, the eight step sequence has been completed and the sequence begins repeating itself for subsequent command pulses.

For commands which direct half step movement in a reverse direction, the condition C16 is caused to exist by a reset command, and a command pulse will cause condition C23 to initially exist for the duration that the capacitor 26 is being charged at which time and until the appearance of the next command pulse, the condition C31 occurs. For the next command pulse being received, the condition C22 will occur and the following command pulse will produce condition C21 until the capacitor 26 is charged at which time condition C29 will occur. The states of the output terminals P, Q, R and S for these conditions provide the proper sequence of energization of the winding phases in the reverse half step sequence.

The resistance 24 and condenser 26 constitute an R-C network which by their values set the duration during which the junction 23 remains at a 0 state from the time when the terminal Q1 is shifted to a 1 state by the command pulse until the junction 23 achieves a 1 state which in turn causes the terminal D to shift to a 1 state. During this delay, it will be understood that there is no change in the conduction of the transistors from the previous condition of conduction, note for example conditions conducting and C1, C2 and C3, etc. The duration determines at what rate of command pulses the motor will be energized according to a full step sequence even with a half step command. If, for example, it is desired to provide the half step sequence to perhaps 1,000 steps per second and full steps for higher rates, the duration is set at 0.001 seconds. For speeds below this selected speed, the capacitor will be charged to the 1 state before the next command pulse appears and the half step sequence of where one transistor only is conducing will be effected. For speeds above the selected value the motor will operate at the full step sequence as the time between command pulses will be less than the duration. Further, even when using full step sequences, there will be no loss of ultimate motor movement for each command pulse.

The value of resistance 24 is selected to be larger than the value of resistance 25, the latter having a small value to permit discharging of the capacitor 26 faster than it is charged through the resistance 24.

If it is desired to eliminate the shifting of the half step sequence to the full step sequence above a certain speed then the capacitor 26 may be eliminated or so reduced in value so as to render the duration instantaneous and the junction 23 will thereby assume the 1 state with the occurrence of the state. Of course, other connections may achieve the same result as, for example, connecting the junction 23 directly to the terminal Q1.

One form of memory 13 that may be employed is available from Signetics Corporation and designated by number 8223. It is a 256 bit bipolar (32 × 8) memory which may be either field programmed to the program herein disclosed or manufactured with such a program. The flip-flops 14 are also available from the same company and designated S54175 or N74175 while the two NAND gates 20 and 23 are formed into one component as a dual NAND Schmitt trigger bearing a number S5413 or N7413. The Schmitt trigger has some hysteresis which has been found helpful in assuring positive operation of the trigger in accordance with the value of voltage at the junction 23.

By shifting to the full step sequence, the high speed torque with a constant voltage power source is essentially increased approximately 25%. While the heretofore description of the operation has utilized, as a reference starting point, a reset command, it will be understood that such a command is seldom used as the system can shift from one operating mode to another without a reset command. Further, the use of a reset command is not particularly desirable as it may produce motor movement without command pulses.

It will accordingly be understood that there has been disclosed a motor control that is capable of controlling the energization of the windings of phases of a stepping motor in accordance with input commands of the direction and the extent of movement of the step produced for each command pulse. The control is rendered quite reliable, compact and economical by the use of a programmed memory which accepts any one of a plurality of input conditions and produces the one output condition that corresponds thereto. A portion of the output condition controls the energization of the winding phases of the motor while another portion is used to provide at least some of the input condition required for the energization that produces the next step in the commanded movement. Further to increase the torque at high stepping speeds for half step movement the motor control provides for full step movement while still retaining the half step movement at low speeds.

Variations and modifications may be made within the scope of the claims and portions of the improvements may be used without others.

I claim:

1. A motor control for a stepping motor having windings that are differently energizable in a repeating sequence with each change of energization producing an incremental movement and in which each change results from the receipt of a command pulse, said control comprising memory means having an input and an output, said output being adapted to produce a plurality of different conditions with there being one output condition for each different energization, said input being adapted to receive one of a plurality of different input conditions with each input condition producing only one output condition whereby for each different input condition there is produced only its associated output condition, means for receiving a portion of the output to energize the windings in accordance with the condition thereof, said output having a second portion and means for receiving a command pulse and applying the second portion to the input upon receipt of the pulse.

2. The invention as defined in claim 1 in which the second portion forms part of the input condition needed to produce the output condition required for the next energization in the sequence.

3. The invention as defined in claim 1 in which the control includes means for receiving a direction command and in which said direction command forms part of the input condition.

4. The invention as defined in claim 3 in which the windings are energized in a different sequence for movement in one direction than in the other and in which there is a different output condition for each energization of each sequence.

5. The invention as defined in claim 1 in which the control includes means for receiving an extent of movement command for each command pulse and in which said command forms part of the input condition.

6. The invention as defined in claim 5 in which the windings are energized in a different sequence for one extent of movement than for another and in which there is a different output condition for each energization of each sequence.

7. The invention as defined in claim 6 in which there are a plurality of command pulses, and there are means for shifting the extent of movement command from one sequence to the other for rates of command pulses above a selected rate.

8. The invention as defined in claim 7 in which the shifting means includes means for maintaining one input condition for a time interval that approximates the duration between command pulses at the selected rate.

9. The invention as defined in claim 8 in which the one input condition is the same input condition as that existed for the immediately prior command pulse.

10. A motor control for receiving command pulses and processing the pulses to produce an incremental movement of a stepping motor for each pulse received, said motor having windings that are energizable according to one sequence for one extent of incremental movement for each command pulse and are energizable according to a second sequence for producing a second extent of movement for each command pulse, means for receiving an extent of movement command directing the extent of movement, means for energizing the windings according to the sequence directed by the extent of movement command and means for shifting the sequence of energization to the other sequence for rates of command pulses above a selected value while maintaining the extent of movement for the pulses in accordance with the extent of movement command.

11. The invention as defined in claim 10 in which one sequence energizes the windings to produce a movement of one step for each command pulse and in which the other sequence energizes the windings to produce a movement that is one half of the extent of a step.

* * * * *